(12) United States Patent
Dilda et al.

(10) Patent No.: US 12,551,495 B2
(45) Date of Patent: Feb. 17, 2026

(54) PHYTOECDYSONES AND DERIVATIVES THEREOF FOR USE IN TREATING DISORDERED RESPIRATORY FUNCTION ON VIRAL INFECTION

(71) Applicants: BIOPHYTIS, Paris (FR); SORBONNE UNIVERSITE, Paris (FR)

(72) Inventors: Pierre Dilda, Paris (FR); René Lafont, Paris (FR); Stanislas Veillet, Savigny sur Orge (FR); Samuel Agus, Cambridge, MA (US); Waly Dioh, Bretigny sur Orge (FR); Serge Camelo, La Plaine Saint-Denis (FR); Mathilde Latil, Paris (FR); Mounia Chabane De Saint Aubin, Paris (FR); Cendrine Tourette, Paris (FR)

(73) Assignees: BIOPHYTIS, Paris (FR); SORBONNE UNIVERSITE, Paris (FR)

( * ) Notice: Subject to any disclaimer, the term of this patent is extended or adjusted under 35 U.S.C. 154(b) by 686 days.

(21) Appl. No.: 17/915,865

(22) PCT Filed: Mar. 24, 2021

(86) PCT No.: PCT/FR2021/050503
§ 371 (c)(1),
(2) Date: Sep. 29, 2022

(87) PCT Pub. No.: WO2021/198588
PCT Pub. Date: Oct. 7, 2021

(65) Prior Publication Data
US 2023/0128105 A1 Apr. 27, 2023

(30) Foreign Application Priority Data
Mar. 30, 2020 (FR) ...................................... 2003131

(51) Int. Cl.
*A61K 31/575* (2006.01)
*A61P 11/00* (2006.01)
*A61P 31/14* (2006.01)

(52) U.S. Cl.
CPC ............ *A61K 31/575* (2013.01); *A61P 11/00* (2018.01); *A61P 31/14* (2018.01)

(58) Field of Classification Search
None
See application file for complete search history.

(56) References Cited

U.S. PATENT DOCUMENTS

| | | | | |
|---|---|---|---|---|
| 2017/0226151 A1* | 8/2017 | Lafont | ................. | B60F 3/0007 |
| 2020/0148718 A1 | 5/2020 | Lafont et al. | | |
| 2020/0179407 A1 | 6/2020 | Dilda et al. | | |

FOREIGN PATENT DOCUMENTS

| | | |
|---|---|---|
| CN | 105037471 | 11/2015 |
| KR | 10-2018-0096079 | 8/2018 |
| WO | 2018/197708 | 11/2018 |
| WO | 2018/197731 | 11/2018 |
| WO | 2020/187679 | 9/2020 |

OTHER PUBLICATIONS

Bartley et al. "Aging augments the impact of influenza respiratory tract infection on mobility impairments, muscle-localized inflammation, and muscle atrophy" 2016.*
Bone et al. "Sarcopenia and frailty in chronic respiratory disease: Lessons from gerontology" 2017.*
International Search Report for PCT/FR2021/050503, mailed Sep. 14, 2021, 9 pages.
Written Opinion of the ISA for PCT/FR2021/050503, mailed Sep. 14, 2021, 10 pages.
Akihisa et al., "Antitubercular Activity of Triterpenoids from Asteraceae Flowers", Biol. Pharm. Bull, https://www.jstage.jst.go.jp/article/bpb/28/1/28_1, XP055757580, Jan. 1, 2005, pp. 158-160.
Liu et al., "TI Research on active compounds of Maxingyigan Decoction for treatment of coronavirus disease 2019 based on network pharmacology and molecular docking", Chinese Traditional and Herbal Drugs, http://www.tiprpress.com/zcy/article/abstract/2020, XP055757570, Mar. 3, 2020, pp. 1741-1749.
Wen et al., "Specific Plant Terpenoids and Lignoids Possess Potent Antiviral Activities against Severe Acute Respiratory Syndrome Coronavirus", Journal of Medicinal Chemistry, vol. 50, No. 17, XP055309833, Aug. 1, 2007, pp. 4087-4095.
Anonymous, "Zucero Therapeutics to investigate anti-viral properties of pixatimod against COVID-19—Zucero Therapeutics", https://www.zucero.com.au/blog/zucero-therapentics-to-investigate-anit-viral-properties-of-pizatimod-against-covid-19, XP055757607, Mar. 25, 2020, pp. 1-5.
Dilda P et al., "P.311B1O101 demonstrates combined beneficial effects on skeletal muscle and respiratory functions in a mouse model of Duchenne muscular dystrophy", Neuromuscular Disorders, Elsevier Ltd, GB, vol. 29, Sep. 29, 2019, 1 page.
Anonymous, "Biophytis Launches Cova Clinical Study With Sarconeos (BIO101) in COVID-19", https://files.webdisclosure.com/921141/Biophytis_COVA_Launch_EN_PR.pdf, XP055756761, Apr. 7, 2020, pp. 1-3.
Anonymous, "Testing the Efficacy and Safety of BIO101 for the Prevention of Respiratory Deterioration in COVID-19 Patients—(COVA)", https://clinicaltrials.gov/ct2/show/NCT04472728, XP055756779, Dec. 3, 2020, pp. 1-10.
Akihisa et al., "Antibercular Activity and Inhibitory Effect on Epstein-Barr Virus Activation of Sterols and Ployisoprenepolyols from an Edible Mushroom, Hypsizigus marmoreus", Biol. Pharm Bull, Jun. 2005, pp. 1117-1119.

* cited by examiner

*Primary Examiner* — Danah Al-Awadi
(74) *Attorney, Agent, or Firm* — NIXON & VANDERHYE

(57) ABSTRACT

Disclosed are phytoecdysones and semisynthetic derivatives of phytoecdysones, intended to be used in treating impairment of the respiratory function in mammals, in particular in the context of a viral infection and more particularly during an infection by a coronavirus.

11 Claims, 7 Drawing Sheets

[Fig. 1]
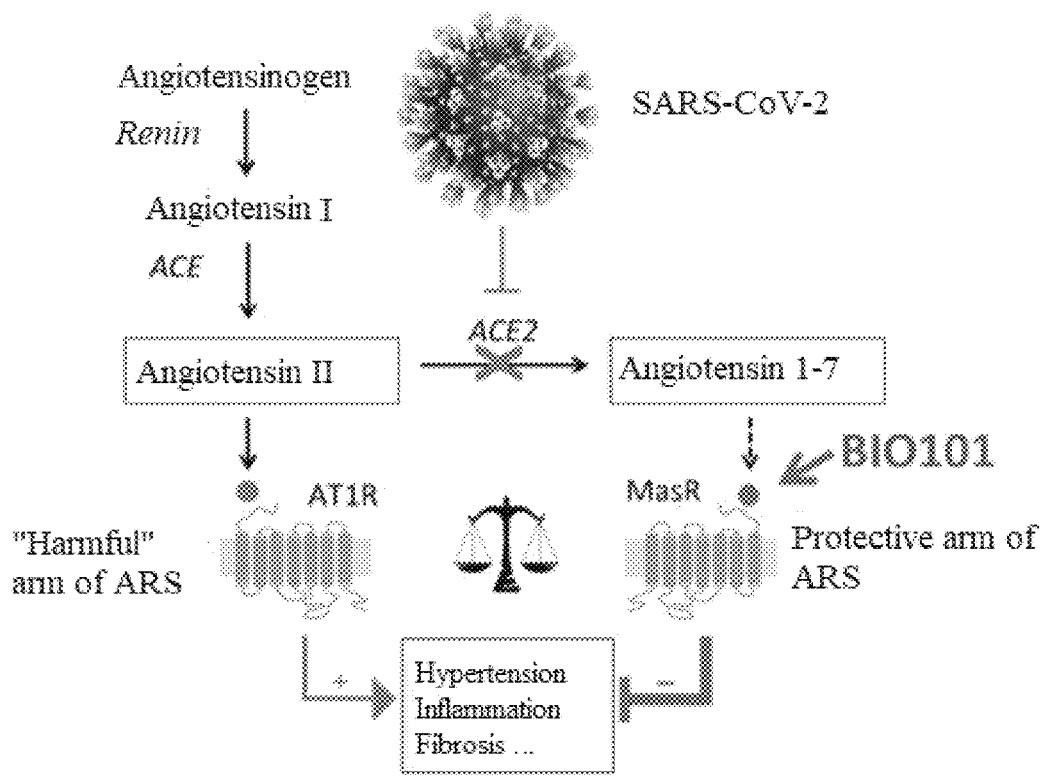
[Fig. 2A]
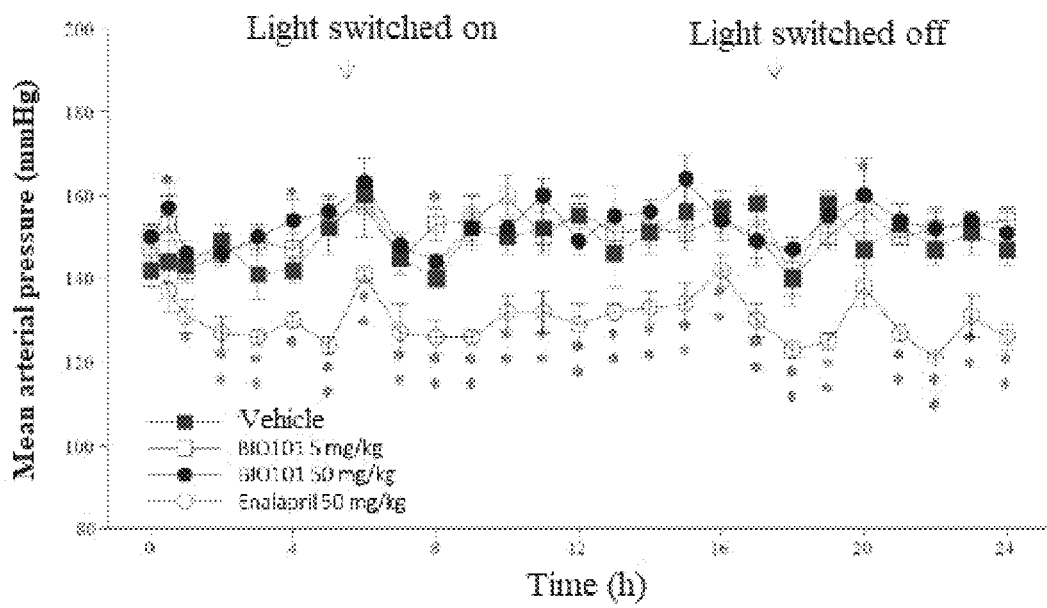

[Fig. 2B]
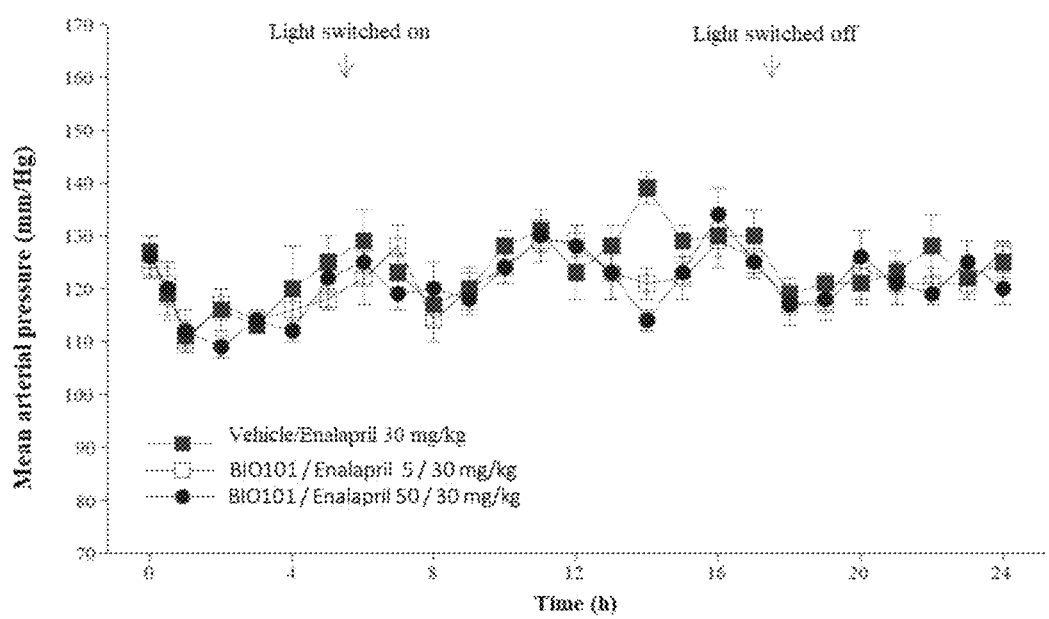
[Fig. 3A]
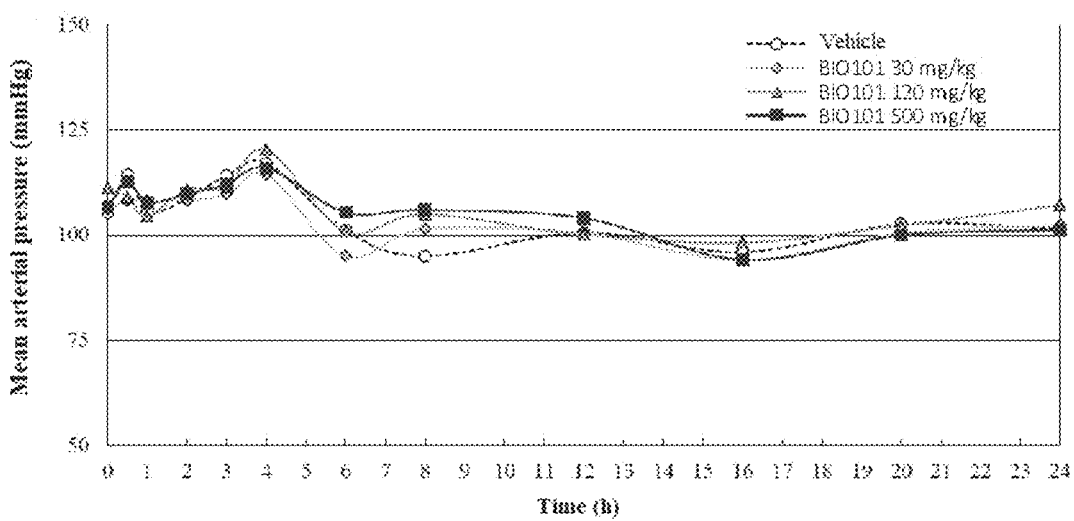

[Fig. 3B]
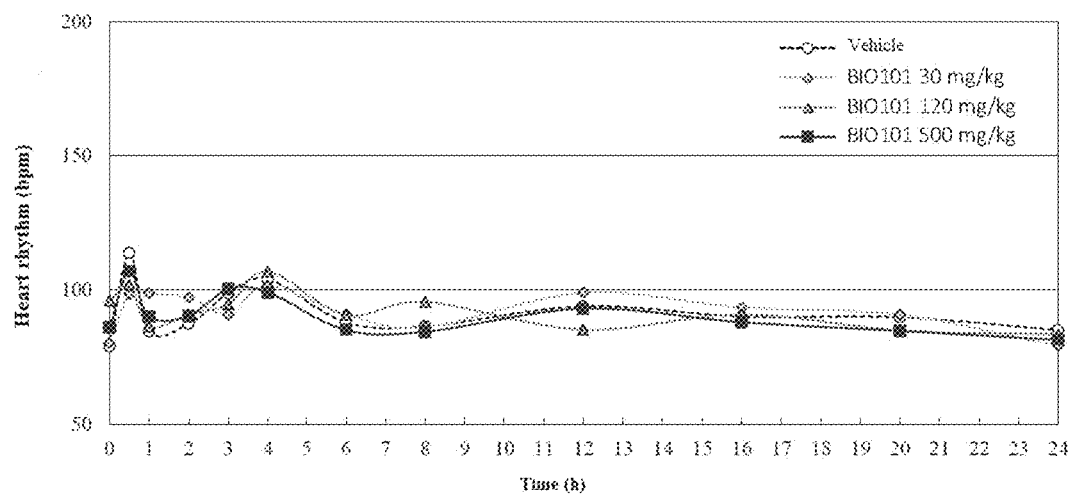
[Fig. 4A]
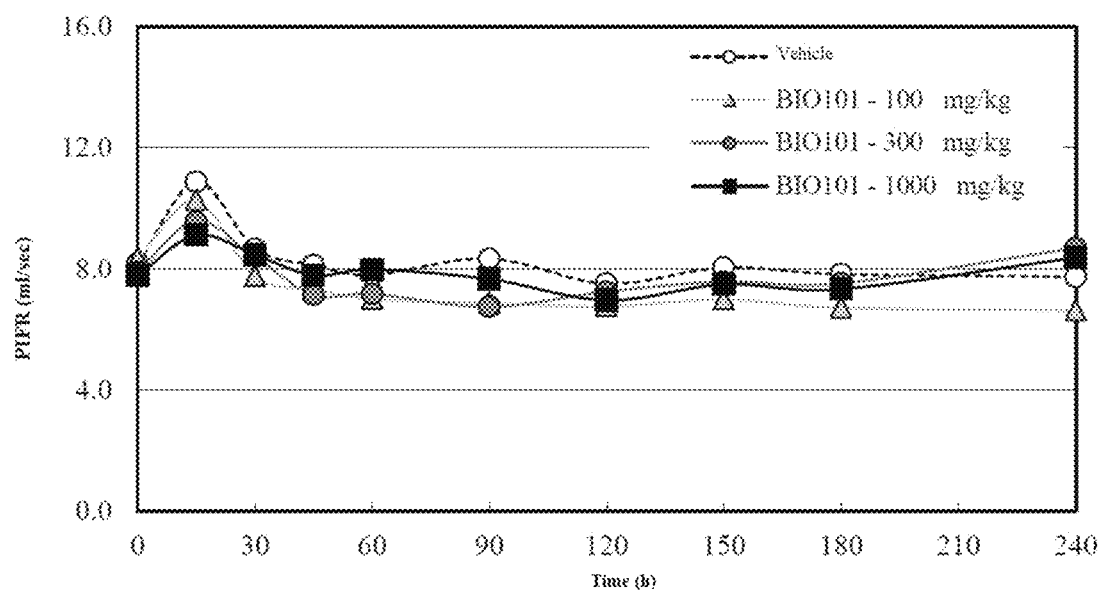

[Fig. 4B]
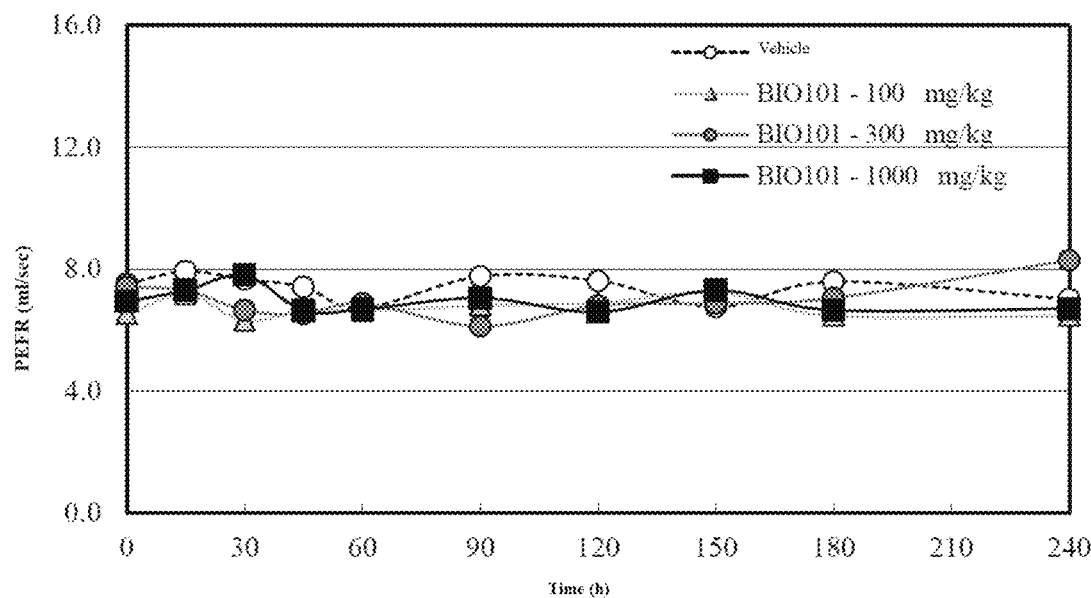
[Fig. 4C]
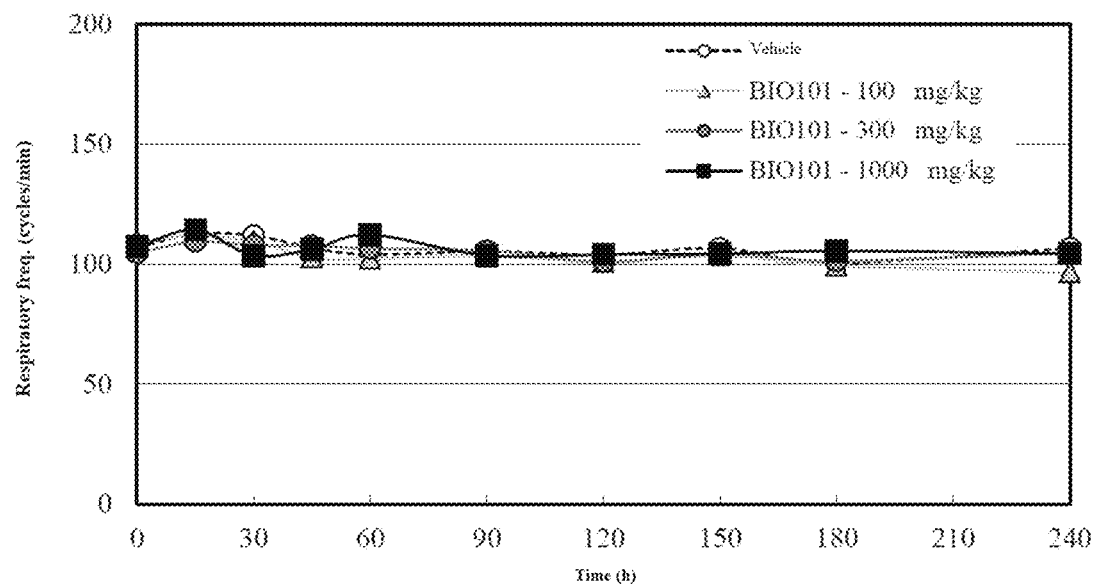

[Fig. 4D]
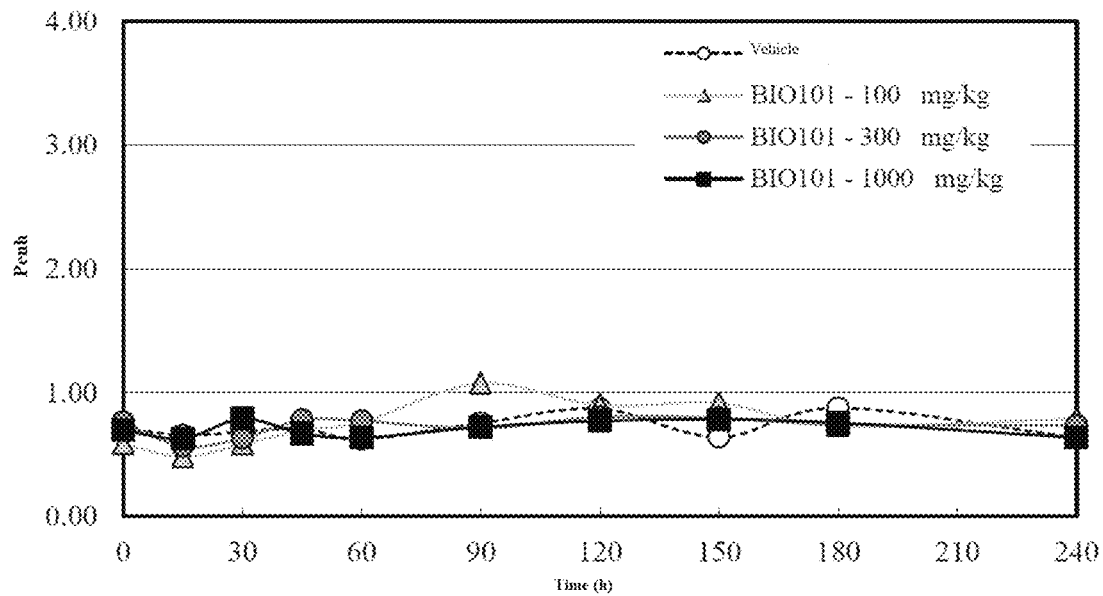
[Fig. 5]
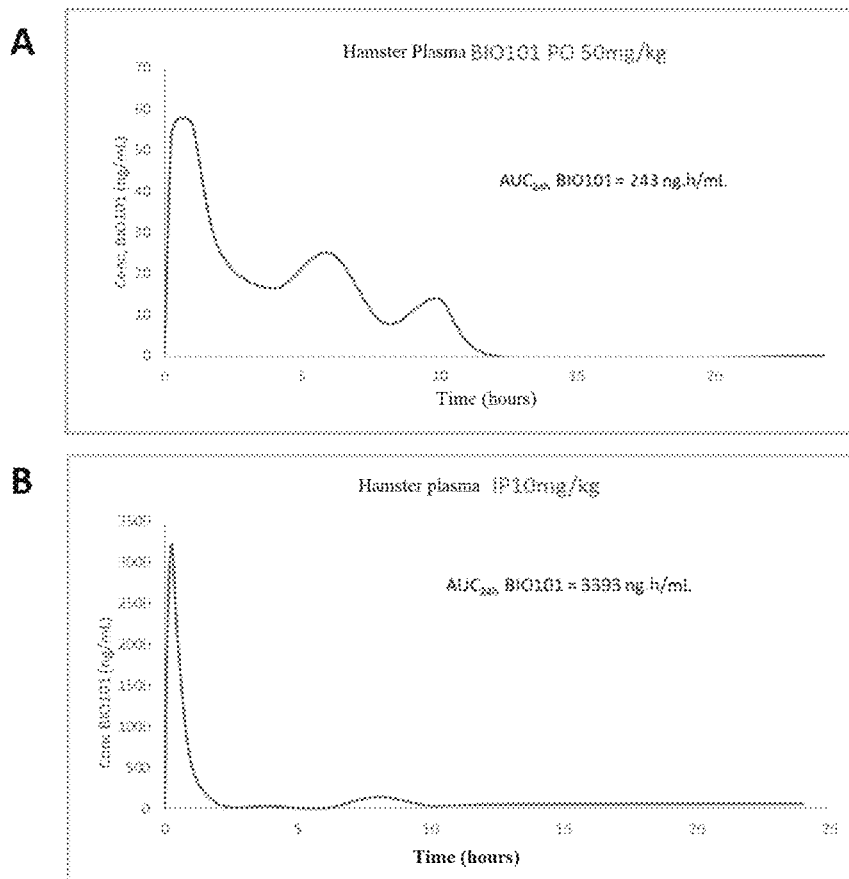

[Fig. 9]
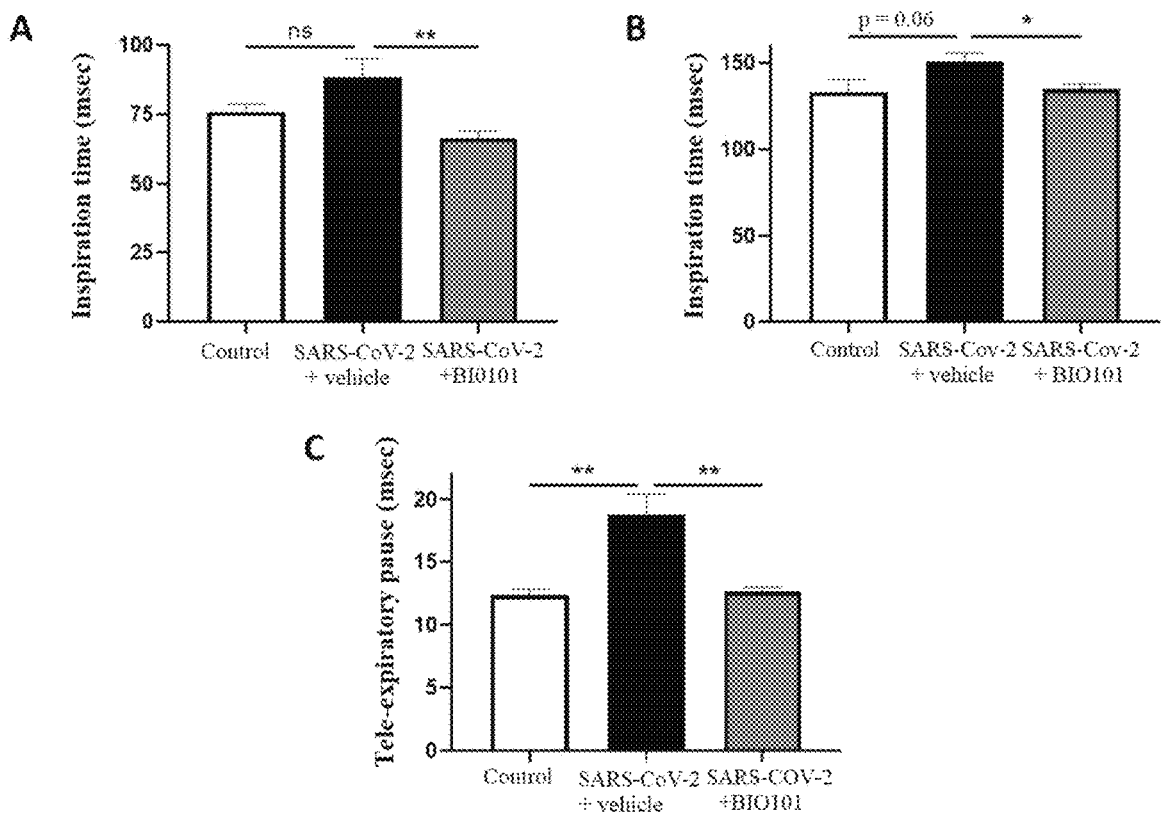

PHYTOECDYSONES AND DERIVATIVES THEREOF FOR USE IN TREATING DISORDERED RESPIRATORY FUNCTION ON VIRAL INFECTION

CROSS-REFERENCE TO RELATED APPLICATIONS

This application is the U.S. national phase of International Application No. PCT/FR2021/050503 filed Mar. 24, 2021 which designated the U.S. and claims priority to FR 2003131 filed Mar. 30, 2020, the entire contents of each of which are hereby incorporated by reference.

BACKGROUND OF THE INVENTION

Field of the Invention

The invention relates to the use of phytoecdysones and of semisynthetic derivatives of phytoecdysones for treating impairments of the respiratory function, particularly in the context of pathologies of viral origin.

Description of the Related Art

Respiratory infections of viral origin affect the upper and lower respiratory tract. The viruses responsible for these infections are numerous. It is a case in particular of the rhinovirus, the syncytial respiratory virus, the flu (influenza) virus, the type A influenza (H1N1) virus and coronaviruses.

There is a great diversity of animal coronaviruses. In the course of the last twenty years, the transmission of coronaviruses to humans has caused several fatal epidemics. Human coronaviruses cause infections of the upper and lower respiratory tracts.

A proportion of patients, variable according to the epidemics and coronaviruses involved, develop a rapid aggravation of respiratory insufficiency and acute respiratory distress syndrome (ARDS, Mckay & Al-Haddad 2009) requiring intubation.

ARDS represents the main cause of mortality in patients infected by coronaviruses (Greenland et al. 2020; Zhou et al. 2020). Consequently, it is essential to detect and treat respiratory problems as soon as possible.

The three main fatal coronavirus epidemics in the $21^{st}$ century are those of 2003 (SARS-CoV originating from the Guangdong Province, China), that of 2012 (MERS-CoV originating from the Middle East) and that of 2019 (SARS-CoV-2, originating from Hubei, China).

For example, the mortality rate in patients during the current COVID-19 pandemic is 3.6%. Thirteen percent of the patients affected are considered to be serious (i.e. with respiratory decompensation). At the present time, there are more than 500,000 cases and more than 25,000 deaths throughout the world caused by SARS-CoV-2.

To conclude, respiratory insufficiency, characterized by the inability of the respiratory system to provide adequate oxygenation and elimination of carbon dioxide, is common in patients infected by coronaviruses.

Consequently, evaluating the malfunctioning of the respiratory function is an important parameter to be considered in establishing and evaluating therapeutic solutions in the context of a coronavirus infection.

The angiotensin-2 converting enzyme (ACE2), in particular expressed in pulmonary epithelial and endothelial cells, is the receptor of SARS-CoV and of SARS-CoV-2, respectively responsible for the SARS epidemics of 2003 and 2019 (Hoffmann et al. 2020; Wan et al. 2020; Xu et al. 2020). ACE2, which forms part of the angiotensin renin system (ARS), converts angiotensin II (Ang II) into angiotensin 1-7 (Ang-1-7). Ang-1-7 mediates the anti-inflammatory, antioxidant and vasodilator effects by binding with the Mas receptor (MasR) (Magalhaes et al. 2018; Jiang et al. 2013; van Twist et al. 2014). Conversely, the ACE converts angiotensin I (Ang I) into angiotensin II (Ang II). The binding of Ang II to its receptor (type 1 Ang II receptor (AT1)) causes vasoconstrictor, pro-inflammatory and pro-oxidizing effects. The ACE/Ang II/AT1 and ACE2/Ang-1-7/MasR axes are respectively known as the "harmful" and "protecting" arm of the ARS (Santos et al. 2013).

On the basis of the knowledge accumulated with SARS-CoV, it would appear that the interaction of SARS-CoV-2 with ACE2 reduces the activity of ACE2, which results in a lower production of Ang-1-7 and excessive production of Ang II by the ACE, leading to a general disturbance of the ARS. The imbalance between the "protecting" and "harmful" arms of the ARS appears to play a central role in acute pulmonary lesion (APL) and acute respiratory distress syndrome (ARDS) associated with COVID-19 (Kuba et al. 2005; Imai et al. 2005).

Inhibition of the "protecting" ACE2/Ang-1-7/MasR arm of the ARS in favor of the signaling of the "harmful" ACE/Ang II/AT1 axis appears to be the cause of pulmonary vasoconstrictions (Lipworth & Dagg 1994), and inflammatory/oxidizing lesions of the organs, finally progressing towards APL/ARDS in patients infected by SARS-CoV-2 (Zhang & Baker 2017). This theory is supported by a recent study showing that the levels of serum Ang II in COVID-19 patients were significantly higher than in non-infected individuals and, more importantly still, were linearly associated with the viral load and the pulmonary lesions (Liu et al. 2020).

A certain number of studies have demonstrated the potential of stimulating the ACE2/Ang-1-7/Mas axis to produce beneficial effects on the pulmonary tissue and the respiratory function. This is in particular the case in the context of pulmonary emphysema (Candida Bastos et al. 2019), pulmonary fibrosis (Meng et al. 2014; Meng et al. 2015; Shao et al. 2019), pulmonary hypertension (Daniell et al. 2020), pulmonary inflammation (Ye et al. 2020; Chen et al. 2013) and tabagism (Zhang et al. 2018).

Angiotensin 1-7 moreover has vasodilatory properties and has hypotensor effects (Benter et al. 1993) and anti-hypertensor effects (Zhang et al. 2019). Phytoecdysones represent an important family of polyhydroxylated phytosterols structurally similar to insect molting hormones. These molecules are produced by many plant species and participate in their defense against insect pests. The main phytoecdysone is 20-hydroxyecdysone (20E).

20E is pharmacologically active in mammals. It activates the Mas receptor on the protecting arm of the ARS (Dilda et al. 2019). The engagement of Mas by 20E is responsible for a number of preclinical beneficial activities in normal and pathological contexts.

20-hydroxyecdysone has in vivo anti-inflammatory effects in a mouse model of acute lung injury (ALI). Plasmatic inflammatory cytokines (TNF-α, IL-2, IL-6, IL-8) and anti-inflammatory cytokines (IL-4, IL-10) are respectively reduced and increased by treatment with 20-hydroxyecdysone. Modulation of inflammation is associated with a reduction in lung injuries, as shown by the histological examination of the lungs of treated animals (Xia et al. 2016; Song et al. 2019).

BIO101 is an oral preparation of 20-hydroxyecdysone with a purity greater than or equal to 97%. The method for preparing same is disclosed in the international patent application WO 2018/197731 (Lafont et al. 2018). BIO101 is a novel candidate drug developed clinically in sarcopenia and in Duchenne muscular dystrophy. The latter therapeutic application is the subject of the international patent application WO 2018/197708 (Dilda et al. 2018). Semisynthetic derivatives 20-hydroxyecdysone have also been developed, as disclosed in the international patent WO 2015/177469 (Lafont et al. 2015), and are used for such therapeutic applications.

One option aimed at re-establishing equilibrium of the angiotensin renin system (ARS) in patients infected by SARS-CoV or SARS-Cov-2 is inhibiting the "harmful" arm of ARS using either converting enzyme inhibitors (ACE) or antagonists of the angiotensin 2 receptor (AT1). However, it appears inappropriate and potentially dangerous to interfere with the ACE/Ang II/AT1 axis in the context of a coronavirus infection. This is because the ACE inhibitors are known to cause undesirable respiratory effects (Kostis et al. 2005) and the use of antagonists of the AT1 receptor is known to cause the expression of ACE2 (Wang et al. 2016; Klimas et al. 2015), which is the SARS-CoV and SARS-Cov-2 receptor, an effect liable to favor the ingress of the virus in the cells.

It therefore appears advantageous to find another way for reestablishing an equilibrium of the angiotensin renin system (ARS) in infected patients.

SUMMARY OF THE INVENTION

For this purpose, the invention relates to a composition comprising at least one phytoecdysone and/or at least one semisynthetic phytoecdysone derivative, for use thereof in treating impairment of the respiratory function resulting from a viral infection in mammals.

The direct activation, with a phytoecdysone and/or a semisynthetic phytoecdysone derivative, of the "protecting" arm of an angiotensin renin system (ARS), downstream of the angiotensin-2 converting enzyme (ACE2), via the activation of the Mas receptor, appears to be an effective treatment option for re-establishing equilibrium of the ARS during a viral infection in mammals. In addition, phytoecdysones and the semisynthetic derivatives thereof do not recapitulate all the effects of angiotensin 1-7 (Ang-1-7) (Benter et al. 1993; Zhang F. et al. 2019). Though they have the anti-inflammatory and antifibrotic effects thereof, they do not have an effect on the cardiovascular parameters of the mammal. However, a hypotensor effect may prove to be detrimental in a situation of respiratory distress related in particular to a viral infection and to a state of shock (Bitker & Burell et al. 2019; Wujtewicz et al. 2020). Phytoecdysones and the semisynthetic derivatives thereof also advantageously do not have an effect on the peak inspiratory flow rate (PIFR), on the peak expiratory flow rate (PEFR), on the respiratory frequency and finally on the Penh.

In particular embodiments, the invention also meets the following features, implemented separately or in each of the technically operative combinations thereof.

The phytoecdysones and the derivatives thereof are advantageously purified to pharmaceutical grade.

One phytoecdysone that can be used according to the invention is for example 20-hydroxyecdysone and a semisynthetic derivative of phytoecdysone that can be used is for example a semisynthetic derivative of 20-hydroxyecdysone. For this purpose, according to a particular embodiment, the composition includes 20-hydroxyecdysone and/or at least one semisynthetic derivative of 20-hydroxyecdysone.

20-hydroxyecdysone and the derivatives thereof are advantageously purified to pharmaceutical grade.

The 20-hydroxyecdysone used is preferably in the form of an extract of plants that are rich in 20-hydroxyecdysone or in the form of a composition including 20-hydroxyecdysone by way of active agent. Extracts of plants that are rich in 20-hydroxyecdysone are for example extracts of *Stemmacantha carthamoides* (also known as *Leuzea carthamoides*), *Cyanotis arachnoidea* and *Cyanotis vaga*.

The extracts obtained are preferably purified to pharmaceutical grade.

In one embodiment the 20-hydroxyecdysone is in the form of plant extract or an extract of a part of a plant, said plant being selected from plants containing at least 0.5% 20-hydroxyecdysone by dry weight of said plant, said extract including at least 95%, and preferably at least 97%, 20-hydroxyecdysone. Said extract is preferably purified to pharmaceutical grade.

Said extract is hereinafter referred to as BIO101. It remarkably includes between 0 and 0.05%, by dry weight of extract, impurities, such as minor compounds, liable to affect the innocuousness, the availability or the efficacy of a pharmaceutical application of said extract.

According to one embodiment of the invention, the impurities are compounds with 19 or 21 carbon atoms, such as rubrosterone, dihydrorubrosterone or poststerone.

The plant from which BIO101 is produced is preferably selected from *Stemmacantha carthamoides* (also referred to as *Leuzea carthamoides*), *Cyanotis arachnoidea* and *Cyanotis vaga*.

The derivatives of phytoecdysones and in particular of 20-hydroxyecdysone are obtained by semisynthesis and can in particular be obtained in the manner described in the international patent application no. WO 2015/177469 (Lafont et al. 2015).

According to a particular embodiment, the invention relates to the composition for use thereof in the treatment of an impairment of the respiratory function resulting from a viral infection in mammals by a virus selected from rhinovirus, syncytial respiratory virus, flu (influenza) virus, type A influenza virus H1N1) and a coronavirus.

Direct activation of the "protecting" arm of the angiotensin renin system (ARS), downstream of the angiotensin-2 converting enzyme (ACE2), via activation of the Mas receptor, appears to be an effective treatment option for reestablishing equilibrium of the ARS and thus protecting patients infected by a coronavirus from acute respiratory distress syndrome (ARDS).

According to a particular embodiment, the invention relates to the composition for use thereof in treating an impairment of the respiratory function resulting from a viral infection by a coronavirus using ACE2 as a receptor on the surface of the mammal cells.

According to a preferred embodiment, the invention relates to the composition for use thereof in treating an impairment of the respiratory function resulting from a viral infection by SARS-CoV in mammals. SARS-CoV is a coronavirus responsible for a severe acute respiratory syndrome.

According to a particular embodiment, the invention relates to the composition for use thereof in treating an impairment of the respiratory function resulting from a viral infection by SARS-CoV-2 in mammals. SARS-CoV-2 is a type 2 coronavirus responsible for the severe acute respiratory syndrome of the COVID-19 pandemic.

According to a particular embodiment, treating impairment of the respiratory function comprises the prevention and treatment of respiratory insufficiency in a mammal affected by the viral infection.

According to a particular embodiment, treating impairment of the respiratory function comprises the prevention and treatment of acute respiratory distress syndrome in a mammal suffering from the viral infection.

In a particular embodiment, the invention relates to the composition for use thereof in treating at least one or more of the impairments of the respiratory function in a mammal suffering from the viral infection, selected from hypoxia and reduction in the ability to eliminate $CO_2$.

In a particular embodiment, treating impairment of the respiratory function comprises the treatment of the respiratory muscular function.

In one embodiment, the invention relates to the composition for use thereof in mammals in treating an impairment of the respiratory function related to the change in at least one of the parameters selected from:
- mortality and curing characterized by transferring the patient to their home or to a general medicine care service,
- the number of events of the respiratory insufficiency type, defined by an insufficient arterial oxygen saturation, the need for mechanical ventilation (including the patients who have not undergone intubation) and by the need for non-invasive respiratory support such as continuous positive pressure ventilation of the respiratory tracts or oxygen at high rate,
- the sequential respiratory failure evaluation score (SOFA), the pulmonary severity index (PSI) and medical imaging that makes it possible to graduate the level of progress of the exudative inflammatory pathology,
- the plasma level of pro-inflammatory and anti-inflammatory cytokines.

In a particular embodiment, the phytoecdysones are administered at a dose of between 1 and 15 milligrams per kilogram per day in humans. Here phytoecdysone also means both phytoecdysones in general and the derivatives thereof, 20-hydroxyecdysone (in particular in extract form) and derivatives thereof.

Preferably, the phytoecdysones are administered at a dose of 200 to 1000 mg/day, on one or more occasions, in a human adult, and a dose of 5 to 350 mg/day, on one or more occasions, in a human infant or baby. Here phytoecdysone means both phytoecdysones in general and derivatives thereof, 20-hydroxyecdysone (in particular in extract form) and derivatives thereof.

In embodiments the composition includes at least one compound considered as a phytoecdysone derivative, said at least one compound being of general formula (I):

[Chem. 1]

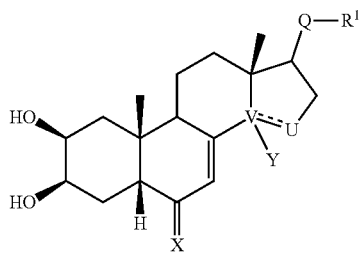

(I)

wherein:
V—U is a single carbon-carbon bond and Y is a hydroxyl group or a hydrogen,
or V—U is a C=C ethylenic bond;
X is an oxygen,
Q is a carbonyl group;
$R^1$ is selected from: a $(C_1-C_6)W(C_1-C_6)$ group; a $(C_1-C_6)W(C_1-C_6)W(C_1-C_6)$ group; a $(C_1-C_6)W(C_1-C_6)CO_2(C_1-C_6)$ group; a $(C_1-C_6)A$ group, A representing a heterocycle optionally substituted by a group of the OH, OMe, $(C_1-C_6)$, $N(C_1-C_6)$ or $CO_2(C_1-C_6)$ type; a $CH_2Br$ group;
W being heteroatom selected from N, O and S, preferably O and even more preferentially S.

In the context of the present invention "$(C_1-C_6)$" means any alkyl group of 1 to 6 carbon atoms, linear or branched, in particular the methyl, ethyl, n-propyl, iso-propyl, n-butyl, iso-butyl, sec-butyl, tert-butyl, n-pentyl and n-hexyl groups. Advantageously it is a case a methyl, ethyl, iso-propyl or tert-butyl group, in particular a methyl or ethyl group, more particularly a methyl group.

In a preferred embodiment, in the formula (I):
Y is a hydroxyl group;
$R^1$ is selected from: a $(C_1-C_6)W(C_1-C_6)$ group; a $(C_1-C_6)W(C_1-C_6)W(C_1-C_6)$ group; a $(C_1-C_6)W(C_1-C_6)CO_2(C_1-C_6)$ group; a $(C_1-C_6)A$ group, A representing a heterocycle optionally substituted by a group of the OH, OMe, $(C_1-C_6)$, $N(C_1-C_6)$ or $CO_2(C_1-C_6)$ type;
W being a heteroatom selected from N, O and S, preferably O and more preferably S.

In embodiments the composition includes at least one compound selected from the following compounds:
No. 1: (2S,3R,5R,10R,13R,14S,17S)-2,3,14-trihydroxy-10,13-dimethyl-17-(2-morpholinoacetyl)-2,3,4,5,9,11,12,15,16,17-decahydro-1H-cyclopenta[a]phenanthren-6-one,
No. 2: (2S,3R,5R,10R,13R,14S,17S)-2,3,14-trihydroxy-17-[2-(3-hydroxypyrrolidin-1-yl)acetyl]-10,13-dimethyl-2,3,4,5,9,11,12,15,16,17-decahydro-1H-cyclopenta[a]phenanthren-6-one;
No. 3: (2S,3R,5R,10R,13R,14S,17S)-2,3,14-trihydroxy-17-[2-(4-hydroxy-1-piperidyl)acetyl]-10,13-dimethyl-2,3,4,5,9,11,12,15,16,17-decahydro-1H-cyclopenta[a]phenanthren-6-one;
No. 4: (2S,3R,5R,10R,13R,14S,17S)-2,3,14-trihydroxy-17-[2-[4-(2-hydroxyethyl)-1-piperidyl]acetyl]-10,13-dimethyl-2,3,4,5,9,11,12,15,16,17-decahydro-1H-cyclopenta[a]phenanthren-6-one;
No. 5: (2S,3R,5R,10R,13R,14S,17S)-17-[2-(3-dimethylaminopropyl (methyl)amino)acetyl]-2,3,14-trihydroxy-10,13-dimethyl-2,3,4,5,9,11,12,15,16,17-decahydro-1H-cyclopenta[a]phenanthren-6-one;
No. 6: 2-[2-oxo-2-[(2S,3R,5R,10R,13R,14S,17S)-2,3,14-trihydroxy-10,13-dimethyl-6-oxo-2,3,4,5,9,11,12,15,16,17-decahydro-1H-cyclopenta[a]phenanthren-17-yl]ethyl]sulfanylacetate ethyl;
No. 7: (2S,3R,5R,10R,13R,14S,17S)-17-(2-ethylsulfanylacetyl)-2,3,14-trihydroxy-10,13-dimethyl-2,3,4,5,9,11,12,15,16,17-decahydro-1H-cyclopenta[a]phenanthren-6-one;
No. 8: (2S,3R,5R,10R,13R,14S,17S)-2,3,14-trihydroxy-17-[2-(2-hydroxyethyl sulfanyl)acetyl]-10,13-dimethyl-2,3,4,5,9,11,12,15,16,17-decahydro-1H cyclopenta[a]phenanthren-6-one.

In embodiments the composition includes at least one compound considered to be a phytoecdysone derivative, said at least one compound being of formula (II):

[Chem. 2]

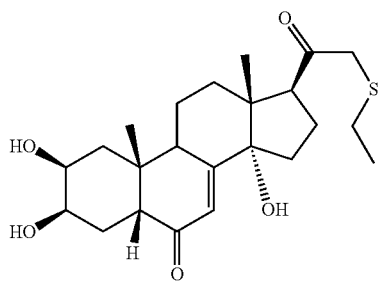

(II)

The compound of formula (11) is hereinafter referred to as BIO103.

In embodiments the composition is incorporated in a pharmaceutically acceptable formulation that can be administered orally.

In the context of the present invention "pharmaceutically acceptable" means that which is useful in preparing a pharmaceutical composition that is generally safe and non-toxic and is acceptable for both veterinary use and human pharmaceutics.

BRIEF DESCRIPTION OF THE DRAWINGS

The invention will be best understood from the reading of the following description, given by way of in no way limitative example and made with reference to the figures, which show:

FIG. 1 shows a diagram illustrating the scientific rationale of the activation of the ACE2/Ang1-7/Mas arm in the context of patients suffering from a coronavirus using ACE2 as receptor.

FIG. 2A shows a graph illustrating the absence of antihypertensor effects of BIO101 in animals that are spontaneously hypertensive. The effects of BIO101 alone were evaluated after a single oral administration. Six SH rats were used in crossover treatments with an elimination period of a minimum of 72 hours between treatments. Prior to the treatment, the animals were equipped with telemetry instruments for measuring arterial pressure. For the experiment described in FIG. 2A the animals received the following treatments: vehicle, either BIO101 at 5 mg/kg, or BIO101 at 50 mg/kg, or Enalapril at 50 mg/kg.

FIG. 2B shows a graph illustrating the absence of hypotensor effects of BIO101 in hypertensive animals already treated with an anti-hypertensor: Enalapril. Enalapril is an inhibitor of the converting enzyme (ACE). The effects of BIO101 alone were evaluated after repeated administration in animals that were treated for 4 days with Enalapril (30 mg/kg*day). Six SH rats were used in crossover treatments with an elimination period of a minimum of 72 hours between treatments. Prior to the treatment, the animals were equipped with telemetry instruments for measuring arterial pressure. For the experiment described in FIG. 2B, the animals received the following treatments: Enalapril at 30 mg/kg for 4 days, or Enalapril at 30 mg/kg+BIO101 at 5 mg/kg for 4 days, or Enalapril at 30 mg/kg+BIO101 at 50 mg/kg for 4 days.

FIG. 3A shows a graph illustrating the effects of BIO101 on the mean arterial pressure evaluated after single oral administration. Four beagle dogs were used in crossover treatments with an elimination period of a minimum of 72 hours between the treatments. Prior to the treatment, the animals were equipped with telemetry instruments for measuring arterial pressure. For the experiment described in FIG. 3A, the animals received the following treatments orally: vehicle, either BIO101 at 30 mg/kg, or BIO101 at 120 mg/kg, or BIO101 at 500 mg/kg.

FIG. 3B shows a graph illustrating the effects of BIO101 on the cardiac frequency evaluated after single oral administration. Four beagle dogs were used in crossover treatments with an elimination period of a minimum of 72 hours between treatments. Prior to the treatment, the animals were equipped with telemetry instruments for measuring cardiac frequency. For the experiment described in FIG. 3B, the animals received the following treatments orally: vehicle, either BIO101 at 30 mg/kg, or BIO101 at 120 mg/kg, or BIO101 at 500 mg/kg.

FIG. 4A shows a graph illustrating the absence of effects of BIO101 on the peak inspiratory flow rate (PIFR) after oral administration of single doses. Eight rats were used in crossover treatments with an elimination period of a minimum of 72 hours between treatments. For this experiment the animals received the following treatments orally: vehicle, either BIO101 at 100 mg/kg, or BIO101 at 300 mg/kg, or BIO101 at 1000 mg/kg. The respiratory parameters are measured by plethysmography for 4 hours 30 minutes.

FIG. 4B shows a graph illustrating the absence of effect of BIO101 on the peak respiratory flow rate (PEFR) after oral administration of single doses. Eight rats were used in crossover treatments with an elimination period of a minimum of 72 hours between treatments. For this experiment the animals received the following treatments orally: vehicle, either BIO101 at 100 mg/kg, or BIO101 at 300 mg/kg, or BIO101 at 1000 mg/kg. The respiratory parameters are measured by plethysmography for 4 hours 30 minutes.

FIG. 4C shows a graph illustrating the absence of effect of BIO101 on the respiratory frequency after oral administration of single doses. Eight rats were used in crossover treatments with an elimination period of a minimum of 72 hours between treatments. For this experiment the animals received the following treatments orally: vehicle, either BIO101 at 100 mg/kg, or BIO101 at 300 mg/kg, or BIO101 at 1000 mg/kg. The respiratory parameters are measured by plethysmography for 4 hours 30 minutes.

FIG. 4D shows a graph illustrating the absence of effect of BIO101 on Penh after oral administration of single doses. Penh represents bronchial reactivity. It is calculated as follows: (PIFR/PEFR)×Pause where Pause=(TE−TR)/TR. TR=relaxation time (the time necessary for expiring 65% of normal volume) and TE=expiratory time (time since start of expiration to start of the following inspiration). Eight rates were used in crossover treatments with an elimination period of a minimum of 72 hours between treatments. For this experiment the animals received the following treatments orally: vehicle, either BIO101 at 100 mg/kg, or BIO101 at 300 mg/kg, or BIO101 at 1000 mg/kg. The respiratory parameters are measured by plethysmography for 4 hours 30 minutes.

FIG. 5 shows the pharmacokinetic profiles of BIO101 in Syrian hamster plasma. These are graphs showing the plasma concentrations as a function of time after single oral administration (PO) of BIO101 at 50 mg/kg formulated in a methylcellulose 4000 cP 0.5% medium in water (FIG. 5A) or after a single administration intraperitoneally (IP) at 10 mg/kg formulated in 0.9% NaCl (FIG. 5B).

FIG. 6 shows the timing diagram of the study of the treatment of impairment of the respiratory function in a Syrian hamster infected by the SARS-CoV-2 virus as well as the various parameters. The study presents 3 groups of animals: control hamsters not infected by SARS-CoV-2 (n=10), hamsters infected with SARS-CoV-2 and treated with the vehicle (n=10) and hamsters infected with SARS-CoV-2 treated with BIO101 IP (10 mg/kg*day; n=10). The respiratory function is evaluated by whole-body plethysmography before inoculation and 5 days after the viral infection. At the end of the study (7 days after viral inoculation), a quantification of the infectious pulmonary viral load is implemented.

FIG. 7 shows a histogram illustrating the quantification of the pulmonary viral load of the various groups of control animals not infected by SARS-CoV-2 (control), infected with SARS-CoV-2 and treated with the vehicle (SARS-CoV-2+vehicle) or infected with SARS-CoV-2 treated with BIO101 IP (SARS-CoV-2+BIO101).

FIG. 8A is a schematic representation of a trace of the recording of a respiration cycle (inspiration then expiration) and various data that can be recorded by whole-body plethysmography. Penh is a measurement without units, calculated by measuring several parameters of the respiratory response curve, in accordance with the formula: (PIFR/PEFR)×Pause where Pause=(TE−TR)/TR (Adler et al., 2004). PIFR: Peak inspiratory flow rate, PEFR: Peak expiratory flow rate, TEP: Tele-expiratory pause, TE: Expiration time, TI: Inspiration time, TR: expiration time necessary for expiring 65% of the total volume of air. FIG. 8B shows the Penh values of the control groups not infected by SARS-CoV-2 (control), infected with SARS-CoV-2 and treated with the vehicle (SARS-CoV-2+vehicle) and infected with SARS-CoV-2 and treated with BIO101 IP (SARS-CoV-2+BIO101) with *$p<0.05$, and **$p<0.01$.

FIG. 9 shows various respiratory parameters measured by whole-body plethysmography of the various groups of control animals not infected by SARS-CoV-2 (control), infected with SARS-CoV-2 and treated with the vehicle (SARS-CoV-2+vehicle) or infected with SARS-CoV-2 treated with BIO101 IP (SARS-CoV-2+BIO101). The parameters measured are: the inspiration time in milliseconds (FIG. 9A), the expiration time in milliseconds (FIG. 9B), the tele-expiratory pause in milliseconds (FIG. 9C) with *$p<0.05$, and **$p<0.01$.

DESCRIPTION OF THE PREFERRED EMBODIMENTS

1. Clinical Test

The inventors tested the phytoecdysones and more particularly BIO101 on the respiratory function and the respiratory parameters of patients suffering from SARS-CoV-2 coronavirus responsible for the COVID-19 pandemic.

The study concerns adults aged 18 years and more, suffering from an infection by SARS-CoV-2 approved by PCR during the last 28 days, and who have developed severe manifestations, during the last 7 days, defined as: signs of respiratory decompensation by one of the following parameters: a respiratory frequency greater than or equal to 25 respiratory cycles (inspiration and expiration) per minute and/or an arterial saturation with oxygen less than or equal to 92% under ambient air or with 3 liters of oxygen per minute.

BIO101 is administered orally daily.

BIO101 is a plant extract selected from the plants containing at least 0.5% 20-hydroxyecdysone by dry weight of said plant, said extract including at least 97% 20-hydroxyecdysone.

The effect of the treatment by BIO101 on the patients affected by the SARS-CoV-2 coronavirus is evaluated at 7, 14 and 28 days on the basis of the following measurements:

Mortality and curing characterized by transferring the patient to their home or to a general medicine care service, The number of events of the respiratory insufficiency type, defined by an insufficient arterial oxygen saturation, the need for mechanical ventilation (including the patients who have not undergone intubation) and by the need for non-invasive respiratory support such as continuous positive pressure ventilation of the respiratory tracts or oxygen at high rate, The effect of the treatment is also evaluated by means of parameters that are the respiratory failure sequential evaluation score (SOFA, Zhou et al. 2020), the pulmonary severity index (PSI, Liu et al. 2020) and medical imaging that makes it possible to graduate the level of progress of the exudative inflammatory pathology.

The effect of BIO101 on the plasma level of pro-inflammatory and anti-inflammatory cytokines is also evaluated.

2. Preclinical Evaluation Relating to the Effects on the Cardiovascular and respiratory parameters The inventors tested the phytoecdysones and more particularly BIO101 on the mean arterial pressure by telemetry, in hypertensive animals after oral administration at the doses of 5 and 50 mg/kg. The study relates to hypertensive type SH (spontaneously hypertensive) rats.

Under the experimental conditions adopted, BIO101 at the doses of 5 and 50 mg/kg does not cause any reduction in mean arterial pressure of the hypertensive animals, and this whatever the dose used (FIG. 2A). BIO101 therefore has no anti-hypertensive effect. On the other hand, Enalapril, an ACE inhibitor, has an anti-hypertensive activity.

When the mean arterial pressure of the animals is normalized by the use of Enalapril at 30 mg/kg for 4 days, the treatment by BIO101 at doses of 5 and 50 mg/kg does not cause any additional reduction in the mean arterial pressure of the animals, and this whatever the dose used (FIG. 2B). This demonstrates that BIO101 does not have any hypotensive effect.

The inventors tested the phytoecdysones and more particularly BIO101 on the mean arterial pressure and the heart rhythm by telemetry in normally tensive animals after oral administration at the doses of 30, 120 and 500 mg/kg. The study related to beagle dogs. Under the experimental conditions of this study, the single oral administration of BIO101 at 30, 120 and 500 mg/kg had no effect on the arterial pressure (FIG. 3A) and the cardiac frequency (FIG. 3B) in conscious male beagle dogs.

The inventors tested the phytoecdysones and more particularly BIO101 on the respiratory parameters by plethysmography in vigil rats after oral administration at the doses of 100, 300 and 1000 mg/kg. Under the experimental conditions of this study, the single oral administration of BIO101 at 100, 300 or 1000 mg/kg had no effect on the peak inspiratory flow rate (PIFR, FIG. 4A), on the peak expiratory flow rate (PEFR, FIG. 4B), on the respiratory frequency (FIG. 4C) and finally on the Penh (FIG. 4D).

3. Tests Implemented on Syrian Hamsters

Syrian hamsters (*Mesocricetus auratus*) are small mammals that have been used as models for infection by respiratory viruses, such as SARS-CoV, the influenza virus or adenoviruses (Miao et al., 2019; Roberts et al., 2005; Iwatsuki-Horimoto, K. et al., 2018; Wold et al., 2012). More recently, it has been shown that, during an experimental intranasal infection with SARS-CoV-2, Syrian hamsters have a moderate illness with a gradual loss of weight, as well as signs of respiratory distress (Chan et al. 2020; Boudewijns et al. 2020). In hamsters, infection by SARS-CoV-2 is associated with high levels of replication of the virus and histopathological evidence of the illness. Pulmonary illness was also revealed by tomodensitometry showing a dilatation of the respiratory tracts and substantial consolidations in the lungs of infected hamsters (Boudewijns et al. 2020).

The clinical manifestations of COVID-19 in humans shares common characteristics with the pulmonary pathology developed in Syrian hamsters infected by SARS-Cov-2 such as viral replication in the lower respiratory tracts, respiratory difficulties, bilateral pulmonary affection, as well as the presence of focused edemata and inflammation (Muñoz-Fontela et al. 2020).

It is therefore accepted that the Syrian hamster constitutes a model of interest in order to study the infection and transmission of the SARS-CoV-2 virus and makes it possible to test various therapeutic solutions.

Various experimental approaches make it possible to monitor the change in the impairment of the respiratory capacities in small animals. It is in particular the case with whole-body plethysmography. The advantages of this technique lie in the fact that it makes it possible to implement monitoring on a vigil animal, free from its movements in a hermetic enclosure and this non-invasively.

Consequently, the stress due to handling the animals in reduced and it is possible to repeat the measurements over prolonged periods. Barometric plethysmography is therefore very much used for measuring the respiratory function and bronchial reactivity in small animals (Chong et al., 1998; Djuric et al., 1998; Hoffman et al., 1999).

A. Oral and Intraperitoneal Pharmacokinetic Study of BIO101 in Healthy Hamsters A pharmacokinetic study of BIO101 was previously implemented in healthy hamsters, without viral infection, in order to determine what administration method made it possible to obtain a plasmatic exposure in hamsters, similar to the plasmatic exposure found in humans, after an oral intake at 350 mg bid of BIO101, during 14 days in a phase 1 clinical study.

The pharmacokinetic study of BIO101 was implemented using female Syrian hamsters, aged 6-7 weeks. The BIO101 molecule was administered either per os (PO, gavage) at a dose of 50 mg/kg of body weight, or intraperitoneally (IP), at a dose of 10 mg/kg of body weight. After administration of BIO101, a blood sample was taken at the tail at the times: t=0.08 h; 0.25 h; 0.5 h; 1 h; 2 h; 4 h; 6 h; 8 h: 10 h; 12 h and 24 h.

The blood samples were centrifuged and the plasmas taken.

A calibration curve is implemented with 9 standards (from 10,000 ng/mL to 10 ng/mL) and three quality controls (from 4000 ng/mL to 40 ng/mL). The standards are diluted in hamster plasma. A part of each sample (standard solutions, or quality control) is transferred into a 96-well plate (200 µL). Next, 4 µL of an internal standard is added (Cyasterone at 10 µg/mL in MeOH). The samples are prepared by deproteinization with the addition of 4 volumes of MeOH (80 µl). After centrifugation, the supernatants of the samples are transferred into a 96-well plate (150 µL) before injection.

LC-MS/MS analysis is implemented with a 1260 infinity HPLC system, and a QQQ6420 mass spectrometer with an ESI source in Positive mode (MRM). The injection volume is 5 µL. BIO101 is eluted on a C18 reverse phase column (2.1*50 mm, 3.5 µm particles; Fortis) with an acetonitrile and water gradient (containing 0.1% formic acid) and a flow rate of 0.3 mL/min.

Analysis of the plasma samples (in accordance with the method described above) made it possible to determine the pharmacokinetic parameters, namely the Cmax, which corresponds to the maximum concentration observed after administration of the molecule, the Tmax, which is the time required for reaching the maximum concentration after administration of a molecule, and the AUC: the area under the curve that corresponds to the plasma exposure.

After a PO administration of 50 mg/kg, the Cmax=58 ng/ml, Tmax=0.25 h, and the plasma exposure is 243 ng·h/ml (FIG. 5A).

After an IP administration of 10 mg/kg, the Cmax=3221 ng/ml, Tmax=0.5 h, and the plasma exposure is 3393 ng·h/ml (FIG. 5B).

An IP administration of BIO101 afforded a plasma exposure very similar to that found in humans after an oral administration of BIO101 for 14 days, at 350 mg bid (3841 ng·h/ml).

Consequently, in order to test the efficacy of BIO101 in hamsters, after a viral infection with SARS-CoV-2, IP administration of BIO101 was selected.

B. Infection of Hamsters with SARS-CoV-2 and Administration of BIO101

A stock inoculum was prepared, with a titer of $10^6$ TCID$_{50}$/mL of the BetaCoV/Belgium/Sart-Tilman/2020/1 strain (Misset et al., 2020) of SARS-CoV-2. An inoculum consisting of 100 microliters of this stock was inoculated in each hamster, i.e. 50 microliters in each nostril. The inoculation was implemented under brief general anesthetic with isoflurane. The animals woke up from the anesthetic after a maximum of 90 seconds.

BIO101 was administered daily, for 7 days, intraperitoneally (IP) at 10 mg/kg formulated in 0.9% NaCl medium.

Figures 6, 7, 8:
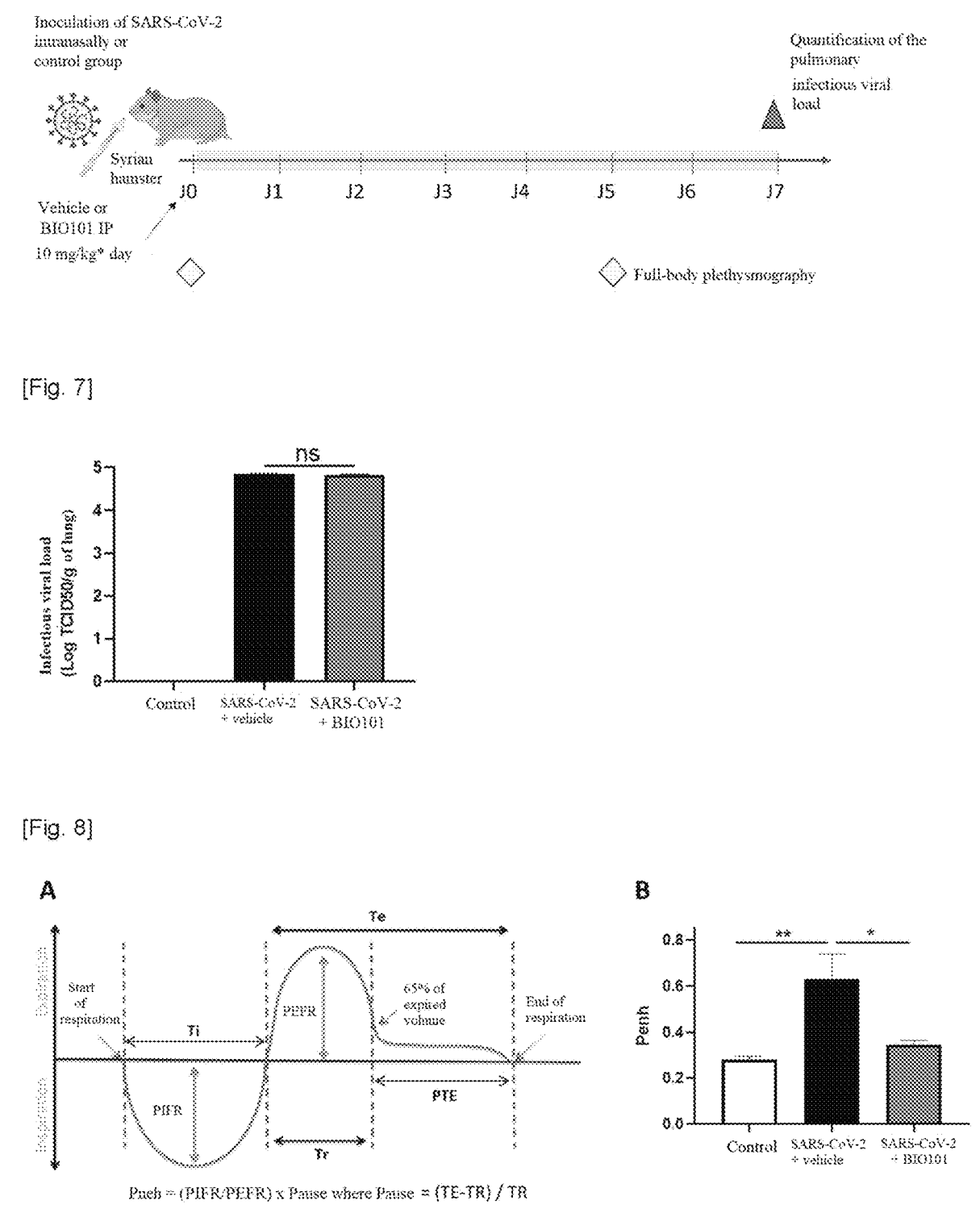

Three groups of female hamster animals of 6-7 weeks were compared: hamsters not infected and treated with the vehicle, hamsters infected with SARS-CoV-2 and treated with the vehicle and hamsters infected with SARS-CoV-2 and treated with BIO101 intraperitoneally (FIG. 6). Each group numbers 10 animals.

C. Analysis of the Pulmonary Viral Load after Infection with SARS-CoV-2

At the end of the study, 7 days after inoculation of the SARS-CoV-2 virus, the pulmonary viral loads of the various groups of animals were compared (FIG. 7).

Vero E6 cells are seeded ($7.5 \times 10^3$ cells per 100 µl in the DMEM/FBS 10% culture medium) and then left to incubate for the entire night. The following day, when the cells are viewed under optical microscope to confirm that the cells are uniformly distributed and have reached approximately 75% confluence. In a level 3 biosecurity environment, seriated dilutions (1:10) of pulmonary homogenates are prepared in infection medium (DMEM/FBS2%). After having removed the growth medium from the cells, the various preparations of pulmonary homogenates are transferred to the previously prepared VeroE6 cell mats. The cells are incubated for 2 hours at 37° C. and then 100 µL of infection medium is added to each well. The plates are incubated at 37° C. for 5 days in order to monitor the cytopathic effect of the various pulmonary homogenates. The viral titer is calculated in accordance with the standard Reed and Muench method. For example, a titer expressed as $10^3$ TCID50/mL in 5 days in the Vero E6 cell line can be translated by: 1 mL of pulmonary homogenate diluted at 1:1000 will infect 50% of the cells in 5 days during the use of the Vero E6 cell line.

Seven days after inoculation of SARS-CoV-2, a pulmonary viral load is still detectable in the lungs of the infected hamsters. The pulmonary viral load of the animals infected with SARS-CoV-2 treated with the vehicle is not different from that observed in the animals infected with SARS-CoV-2 treated with BIO101 (respectively 4.85±0.018 versus 4.83±0.011; p=ns).

As expected, after 7 days of daily treatment, BIO101 has no effect on the pulmonary viral load of the infected animals.

D. Analysis of the Respiratory Function in Hamsters by Whole-Body Plethysmography Full-body plethysmography analyses were implemented at the start of the protocol, on all the animals in the study, before any viral infection, in order to ensure that the respiratory properties of each of the groups are indeed identical (results not presented). At the nadir of the live weight of the animals infected by SARS-CoV-2 (Chan et al. 2020), i.e. 5 days after inoculation of the virus, the analysis of the respiratory function was implemented on the three different groups: hamsters not infected and treated with the vehicle, hamsters infected with SARS-CoV-2 and treated with the vehicle and hamsters infected with SARS-CoV-2 and treated with BIO101 intraperitoneally.

During the plethysmography analysis, the variations in pressures measured with respect a reference chamber make it possible to define numerous respiratory parameters such as the peaks and the inspiratory and expiratory pressure times, the respiratory frequency, and a quantity without unit called Penh (enhanced Pause) that makes it possible to evaluate bronchial reactivity (Menachery et al., 2015) (FIG. 8A).

The Penh value is an important index to be defined since the variations therein change in parallel with those of the respiratory resistance and it therefore represents a parameter predictive of changes in the resistive properties of the respiratory system (Hamelmann et al., 1997; Bergren, 2001; Onclinx et al., 2003).

In addition, during infectious viral pathologies, in particular coronavirus, impairment of the lower respiratory tracts causes a change in the respiratory parameters measured by means of plethysmography, with, as examples, an increase in the Penh, and in the expiration time (Menachery et al., 2015; Dinnon et al., 2020).

As previously described in the literature (Menachery et al., 2015; Dinnon et al., 2020), the Penh value is significantly increased in the group of hamsters infected by SARS-CoV-2 treated with the vehicle, compared with the non-infected control group (respectively 0.63±0.11 versus 0.28±0.01; p<0.01). When the infected animals received the treatment by BIO101 for 5 days, it is found that the Penh value (0.35±0.02) is significantly lower compared with the infected animals treated with the vehicle (p<0.05) (FIG. 8B).

The inspiration time and expiration time tend to increase in the group of infected hamsters treated with the vehicle in comparison with the group of control hamsters, not infected (FIGS. 8A, 9A and 9B). This is because the inspiration time increases from 75.9±2.9 msec to 88.4±6.87 msec and the expiration time increases from 133.2±7.4 msec to 150.7±5.2 msec (p=0.06). In the group of hamsters infected by SARS-CoV-2 and having received the BIO101 treatment for 5 days, a significantly lower inspiration time is observed (66.4±2.6 msec; p<0.01) compared with the infected group treated with the vehicle (88.4±6.87 msec). In the same way, a significantly lower expiration time (134.9±3.2 msec; p<0.05) compared with the infected group treated with the vehicle (150.7±5.2 msec) is observed.

Another parameter of the respiratory cycle was evaluated. This was the tele-expiratory pause (TEP) (FIGS. 8A and 9C). The TEP corresponds to the expiratory flow rate plateau at the end of the expiration. During a profound respiratory pathology, the bronchioles are at least partially obstructed, and consequently the resistance to flow is increased, which slows emptying and prolongs the TEP (Menachery et al., 2015). The length of the TEP therefore provides a measurement of the difficulty in expiring at the end of the normal volume and this difficulty is proportional to the degree of obstruction of the lower respiratory tract (either by a luminal obstacle, or simply because the inflammatory edema of the wall narrows the cross-sectional surface).

As expected, the expiratory pause time increases significantly in hamsters infected with SARS-CoV-2 compared with the non-infected hamsters in the control group (respectively 18.8±1.6 msec versus 12.4±0.5 msec; p<0.01). Remarkably, in the group of hamsters infected with SARS-CoV-2 that received the BIO101 treatment, this expiratory pause time is significantly shorter (12.6 S0.3 msec; p<0.01) compared with the infected animals treated with the vehicle.

Daily administration of BIO101 for 5 days restores the expiratory pause time of the treated animals (IC 95%: 11.9-13.4), to a level comparable to that found in the non-infected control animals (IC 95%: 11.3-13.4) (FIG. 9C).

E. Conclusion

The Syrian hamster constitutes a model of interest in order to study the infection and transmission of the SARS-CoV-2 virus and makes it possible to test various therapeutic solutions. BIO101 administered intraperitoneally at a dose of 10 mg/kg*day makes it possible to obtain a plasma exposure of BIO101 in the hamsters similar to that obtained in patients exposed to 350 mg of BIO101 twice per day for 14 days. In addition, at 7 days post infection, BIO101 has no significant effect on the pulmonary viral load.

On the other hand, and remarkably, this study demonstrates significant beneficial effects of the treatment by BIO101 on respiratory parameters of hamsters infected by SARS-CoV-2, in particular on indicators that measure the resistance of the respiratory tracts to the passage of air (Penh, TEP). It has been demonstrated that the viral illness increases the resistance of the respiratory tract, which is expected during acute pulmonary infections. This study on the respiratory function implemented by whole-body plethysmography reveals that BIO101 significantly attenuates this dysfunction (Penh, TEP) but also the extension of the expiration time during the illness, which confirms the attenuation of the TEP.

A treatment with phytoecdysones, in particular BIO101, makes it possible to improve the pulmonary functions in a model of mammals infected by SARS-CoV-2.

Bibliographical References

Adler A, Cieslewicz G, Irvin C G. Unrestrained plethysmography is an unreliable measure of airway responsiveness in BALB/c and C57BL/6 mice. J. Appl. Physiol. (1985). (2004); 97(1):286-92.

Benter I F, Diz D I, Ferrario C M. Cardiovascular actions of Angiotensin (1-7). *Peptides* 1993; 14: 679-684.

Bitker L, Burrell L M. Classic and nonclassic renin-angiotensin systems in the critically ill. *Crit. Clin Care* 2019; 35: 213-227.

Boudewijns, R. et al. STAT2 signaling as double-edged sword restricting viral dissemination but driving severe pneumonia in SARS-CoV-2 infected hamsters. Nature Communication, 11, 5838 (2020).

Candida Bastos A, Magalhães G S, Gregório J F, Matos N A et al. Oral formulation angiotensin-(1-7) therapy attenuates pulmonary and systemic damage in mice with emphysema induced by elastase. *Immunobiology.* 2020: 151893.

Chan, J. F.-W. et al. Simulation of the clinical and pathological manifestations of coronavirus disease 2019 (COVID-19) in golden Syrian hamster model: implications for disease pathogenesis and transmissibility. Clin. Infect. Dis. ciaa325 (2020).

Chen Q, Yang Y, Huang Y, Pan C, Liu L, Qiu H. Angiotensin-(1-7) attenuates lung fibrosis by way of Mas receptor in acute lung injury. *Journal of Surgical Research* 2013; 185: 740-747.

Chen Q F, Kuang X D, Yuan Q F, Hao H et al. Lipoxin A4 attenuates LPS-induced acute lung injury via activation of the ACE-Ang-(1-7)-Mas axis. *Innate Immunity* 2018; 24(5): 285-296.

Chong B T, Agrawal D K, Romero F A, Townley R G. Measurement of bronchoconstriction using whole-body plethysmograph: comparison of freely moving versus restrained guinea pigs. J. Pharmacol. Toxicol. Methods (1998); 39:163-8.

Daniell H, Mangu V, Yakubov B, Park J et al. Investigational new drug enabling angiotensin oral-delivery studies to attenuate pulmonary hypertension. *Biomaterials* 2020; 119750.

Dilda P, Lafont R, Latil M, Serova M, Agbulut O, Veillet S. Use of 20-hydroxyecdysone and the derivatives thereof in the treatment of myopathies. PCT Application 2018; WO2018197708.

Dilda P, Latil M, Serova M, Didry-Barca B, On S, Veillet S, Lafont R. SARCONEOS (API BIO101) targets Mas receptor within the protective arm of the renin angiotensin system and proves efficacy in various models of muscle wasting. *The Journal of Frailty & Aging,* 2019, 8 (S1), S14

Dinnon, K. H., Leist, S. R., Schäfer, A. et al. A mouse-adapted model of SARS-CoV-2 to test COVID-19 countermeasures. Nature 586, 560-566 (2020).

Djuric V J, Cox G, Overstreet D H, Smith I, Dragomir A, Steiner M. Genetically transmitted cholinergic hyper-responsiveness predisposes to experimental asthma. Brain Behav. Immun. (1998); 12:272-84.

Greenland J R, Michelow M D, Wang L, London M J. COVID-19 infection: implications for perioperative and citical care physicians. *Anaesthesiology* 2020; DOI: 10.1097/ALN.0000000000003303.

Hamelmann E, Schwarze J, Takeda K, Oshiba A, Larsen G L, Irvin C G, Gelfand E W. Noninvasive measurement of airway responsiveness in allergic mice using barometric plethysmography. Am. J. Respir. Crit. Care Med.; 156:766-75 (1997).

Hoffman A M, Dhupa N, Cimetti L. Airway reactivity measured by barometric whole-body plethysmography in healthy cats. Am. J. Vet. Res., (1999); 60:1487-92.

Hoffmann M, Kleine-Weber H, Schroeder S, Kruger N et al. SARS-CoV-2 cell entry depends on ACE2 and TMPRSS2 and is blocked by a clinically proven protease inhibitor. *Cell* 2020; https://doi.org/10.1016/j.cell.2020.02.052.

Imai Y, Kuba K, Rao S, Huan Y et al. Angiotensin-converting enzyme 2 protects from severe acute lung failure. *Nature* 2005; 436: 112-116.

Imai, M. et al. Syrian hamsters as a small animal model for SARS-CoV-2 infection and countermeasure development. Proc. Natl Acad. Sci. USA117, 16587-16595 (2020).

Iwatsuki-Horimoto, K. et al. Syrian hamster as an animal model for the study of human influenza virus infection. J. Virol. 92, e01693-17 (2018).

Jiang T, Gao L, Shi J, Lu J et al. Angiotensin-(1-7) modulates renin-angiotensin system associated with reducing oxidative stress and attenuating neuronal apoptosis in the brain of hypertensibe rats. *Pharmacological Research* 2013; 67: 84-93.

Klein S, Herath C B, Schierwagen R, Grace J et al. Hemodynamic effects of the non-peptidic angiotensin-(1-7) agonist AVE0991 in liver cirrhosis. *PLoS ONE* 2015; 10(9): e0138732.

Klimas J, Olvedy M, Ochodnicka-Mackovicova K, Kruzliak P et al. Perinatally administered losartan augments renal ACE2 expression but not cardiac or renal Mas receptor in spontaneously hypertensive rats. *J Cell Mol Med* 2015; 19(8): 1965-2015.

Kostis J B, Kim H J, Rusnak J, Casale T, Kaplan A, Corren J, et al. Incidence and characteristics of angioedema associated with Enalapril. *Arch Intern Med.* 2005 July; 165 (14): 1637-42

Kuba K, Imai Y, Rao S, et al. A crucial role of angiotensin converting enzyme 2 (ACE2) in SARS coronavirus-induced lung injury. *Nature Medicine* 2005; 11(8): 875-879.

Lafont R, Dilda P, Dioh W, Dupont P, Del Signore S, Veillet S. Pharmaceutical grade 20-hydroxyecdysone extract, use of the same and preparation thereof. PCT Application 2018; WO2018197731.

Lafont R, Dioh W, Raynal S, Veillet S, Lepifre F, Durand J D. Chemical compounds and use thereof for improving muscle quality. PCT Application 2015; WO2015177469.

Lipworth B J, Dagg K D. Vasoconstrictor effects of Angiotensin II on the Pulmonary Vascular bed. Chest 1994; 105 (5): 1360-1364.

Liu K, Chen Y, Lin R, Han K. Clinical features of COVID-19 in elderly patients: a comparison with young and elderly patients. *J Infection* 2020; https://doi.org/10.1016/j.jinf.2020.03.005.

Liu Y, Yang Y, Zhang F, Huang F et al. Clinical and biochemical indexes from 2019-nCoV infected patients linked to viral loads and lung injury. *Science China* 2020; 63(3): 364-374.

Magalhaes G S, Barroso L C, Reis A C, Rodrigues-Machado M G et al. Angiotensin-(1-7) promotes resolution of eosinophilic inflammation in an experimental model of asthma. *Frontiers in Immunology* 2018; 9: 58.

MckayA, Al-Haddad M. Acute lung injury and acute respiratory distress syndrome. Anaesthesia, Critical Care & Pain 2009, Volume 9 Number 5, 152-156

Menachery V D, Gralinski L E, Baric R S, Ferris M T. New Metrics for Evaluating Viral Respiratory Pathogenesis. PLoS ONE 10(6): e0131451 (2015)

Meng Y, Yu C H, Li W, Li T et al. Angiotensin-converting enzyme 2/angiotensin-(1-7)/Mas axis protects against lung fibrosis by inhibiting the MAPK/NF-κB pathway. Am J Respir Cell Mol Biol. 2014; 50(4): 723-736.

Meng Y, Li T, Zhou G S, Chen Y, Yu C H et al. The angiotensin-converting enzyme 2/angiotensin (1-7)/Mas axis protects against lung fibroblast migration and lung fibrosis by inhibiting the NOX4-derived ROS-mediated RhoA/Rho kinase pathway. Antioxid Redox Signal. 2015; 22(3): 241-258.

Miao, J., Chard, L. S., Wang, Z. & Wang, Y. Syrian hamster as an animal model for the study on infectious diseases. Front. Immunol. 10, 2329 (2019).

Muñoz-Fontela, C., Dowling, W. E., Funnell, S. G. P. et al. Animal models for COVID 19. Nature 586, 509-515 (2020).

Misset, B., Hoste, E., Donneau A. F., Grimaldi, D., Meyfroidt, G., Moutschen, M., Compernolle, V., Gothot, A., Desmecht, D., Garigliany, M., Najdovski, T., and Laterre, P. F. A multicenter randomized trial to assess the efficacy of convalescent plasma therapy in patients with Invasive COVID-19 and acute respiratory failure treated with mechanical ventilation: the CONFIDENT trial protocol BMC Pulm Med 20:317, (2020)

Onclinx C. Relationship between total pulmonary resistance and the Penh according to the anatomic location of the obstruction of the airways (post-graduate diploma thesis). University of Liege, Faculty of Veterinary Medicine: Liège, (2003).

Roberts, A. et al. Severe acute respiratory syndrome coronavirus infection of golden Syrian hamsters. J. Virol. 79, 503-511 (2005).

Santos R A S, Ferreira A J, Verano-Braga T, Bader M. Angiotensin-converting enzyme 2, angiotensin-(1-7) and Mas: new players of the renin-angiotensin system. *Journal of Endocrinology* 2013; 216(2): R1-R17.

Shao M, Wen Z B, Yang H H, Zhang C Y et al. Exogenous angiotensin (1-7) directly inhibits epithelial-mesenchymal transformation induced by transforming growth factor-β1 in alveolar epithelial cells. *Biomedicine & Pharmacotherapy* 2019; 117:109193.

Song G, Xia X C, Zhang K, et al. Protective effect of 20-hydroxyecdysone against lipopolysaccharides-induced acute lung injury in mice. *Journal of Pharmaceutics and Drug Research* 2019; 2(3): 109-114.

Supé S, Kohse F, Gembardt F, Kuebler W M, Walther T. Therapeutic time window for angiotensin-(1-7) in acute lung injury. British Journal of Pharmacology 2016; 173: 1618-1628.

Tirupula K C, Desnoyer R, Speth R C, Karnik S S. Atypical signaling and functional desensitization response of mas receptor to peptide ligands. *PLoS ONE* 2014; 9(7): e103520.

Van Twist D J, Kroon A A, de Leeuw P W. 2014. Angiotensin-(1-7) as a strategy in the treatment of hypertension? *Curr Opin Nephrol Hypertension* 2014; 23(5): 480-486.

Wan Y, Shang J, Graham R, Baric R S, Li F. Receptor recognition by novel coronavirus from Wuhan: An analysis based on decade-long structural studies of SARS. Journal of Virology 2020; 94(7): e00127-20.

Wang X, Ye Y, Gong H, Wu J, Yuan J, Wang S, Yin P, Ding Z, Kang L, Jiang Q, Zhang W, Li Y, Ge J, Zou Y. The effects of different angiotensin II type 1 receptor blockers on the regulation of the ACE-AngII-AT1 and ACE2-Ang(1-7)-Mas axes in pressure overload-induced cardiac remodeling in male mice. *J Mol Cell Cardiol*. 2016; 97:180-910

Wold, W. S. M. & Toth, K. Chapter three—Syrian hamster as an animal model to study oncolytic adenoviruses and to evaluate the efficacy of antiviral compounds. Adv. Cancer Res. 115, 69-92 (2012).

Wujtewicz M, Dylczyk-Sommer A, Aszkiefowicz A, Zdanowski S, Piwowarczyk S, Owczuk R. COVID-19—what should anaesthesiologists and intensivists know about it? Anaesthesiol Intensive Ther. 2020; 52(1):34-41. doi: 10.5114/ait.2020.93756.

Xia X C, Tang N Y, Xue S P, Wang X Y, Wang W N, Liu R Z, Effects of 20-hydroxyecdysone on expression of inflammation cytokines in acute lung injury mice. Modern Preventive Medicine 2016; 5.

Xu H, Zhong L, Deng J et al. High expression of ACE2 receptor of 2019-nCoV on the epithelial cells of oral mucosa. *International Journal of Oral Science* 2020; 12: 8.

Ye R, Liu Z. ACE2 exhibits protective effect against LPS-induced acute lung injury in mice by inhibiting thr LPS-TLR4 pathway. *Experimental and Molecular Pathology* 2020; 113:104350.

Zhang H, Baker A. Recombinant human ACE2: acing out angiotensin II in ARDS therapy. *Critical Care* 2017; 21(1): 305.

Zhang F, Tang H, Sun S, Luo Y et al. Angiotensin-(1-7) induced vascular relaxation in spontaneously hypertensive rats. *Nitric Oxide* 2019; 88: 1-9.

Zhang Y, Li Y, Shi C, Fu X et al. Angiotensin-(1-7)-mediated Mas1 receptor/NF-kB-p65) signaling is involved in a cigarette smoke-induced chronic obstructive pulmonary disease mouse model. *Environmental Toxicology* 2018; 33: 5-15

Zhou F, Yu T, Du R, Fan G et al. Clinical course and risk factors for mortality of adult inpatients with COVID-19 in Wuhan, China: a retrospective cohort study. *Lancet* 2020; 395:1054-1062.

The invention claimed is:

1. A method for the treatment of an impairment of the respiratory function resulting from a viral infection, by a coronavirus using ACE2 as receptor on the surface of the mammal cells, in mammals, comprising administering to a patient in need thereof, a composition comprising at least 20-hydroxyecdysone.

2. The method according to claim 1, wherein the impairment of the respiratory function results from an infection by a SARS-CoV coronavirus.

3. The method according to claim 1, wherein the impairment of the respiratory function results from an infection by a SARS-CoV-2 coronavirus.

4. The method according to claim 1, wherein the treatment of the impairment of the respiratory function comprises the prevention and treatment of respiratory insufficiency in the mammal suffering from the viral infection.

5. The method according to claim 1, wherein the treatment of the impairment of the respiratory function comprises the prevention and treatment of the acute respiratory distress syndrome in the mammal suffering from the viral infection.

6. The method according to claim 1, wherein the treatment of the impairment of the respiratory function comprises the treatment of the respiratory muscle function.

7. The method according to claim 1, wherein the treatment of the impairment of the respiratory function comprises the treatment of one of the affections of the respiratory function in the mammal suffering from the viral infection selected from hypoxia and reduction in the ability to eliminate $CO_2$.

8. The method according to claim 1, wherein the impairment of the respiratory function is related to the change in at least one of the parameters selected from:
- mortality and curing characterized by transferring the patient to the patient's home or to a general medicine care service,
- the number of events of the respiratory insufficiency type, defined by the need for mechanical ventilation and by the need for non-invasive respiratory support,
- the sequential respiratory failure evaluation score (SOFA) and the pulmonary severity index (PSI) and medical imaging that makes it possible to graduate the level of progress of the exudative inflammatory pathology,
- the plasma level of pro-inflammatory and anti-inflammatory cytokines.

9. The method according to claim 1, wherein the 20-hydroxyecdysone is in the form of an extract of a plant or of a part of a plant, said plant being selected from the plants containing at least 0.5% 20-hydroxyecdysone by dry weight of said plant, said extract including at least 95% of 20-hydroxyecdysone.

10. The method according to claim 9, wherein the composition includes between 0 and 0.05%, by dry weight of the extract, impurities liable to affect the innocuousness, the availability or the efficacy of a pharmaceutical application of said extract.

11. The method according to claim 9, wherein the plant is selected from *Stemmacantha carthamoides*, *Cyanotis arachnoidea* and *Cyanotis vaga*.

* * * * *